INVENTORS
Stanley Richard Barker
Frank Philip Packman

BY De Lio and Montgomery
ATTORNEYS

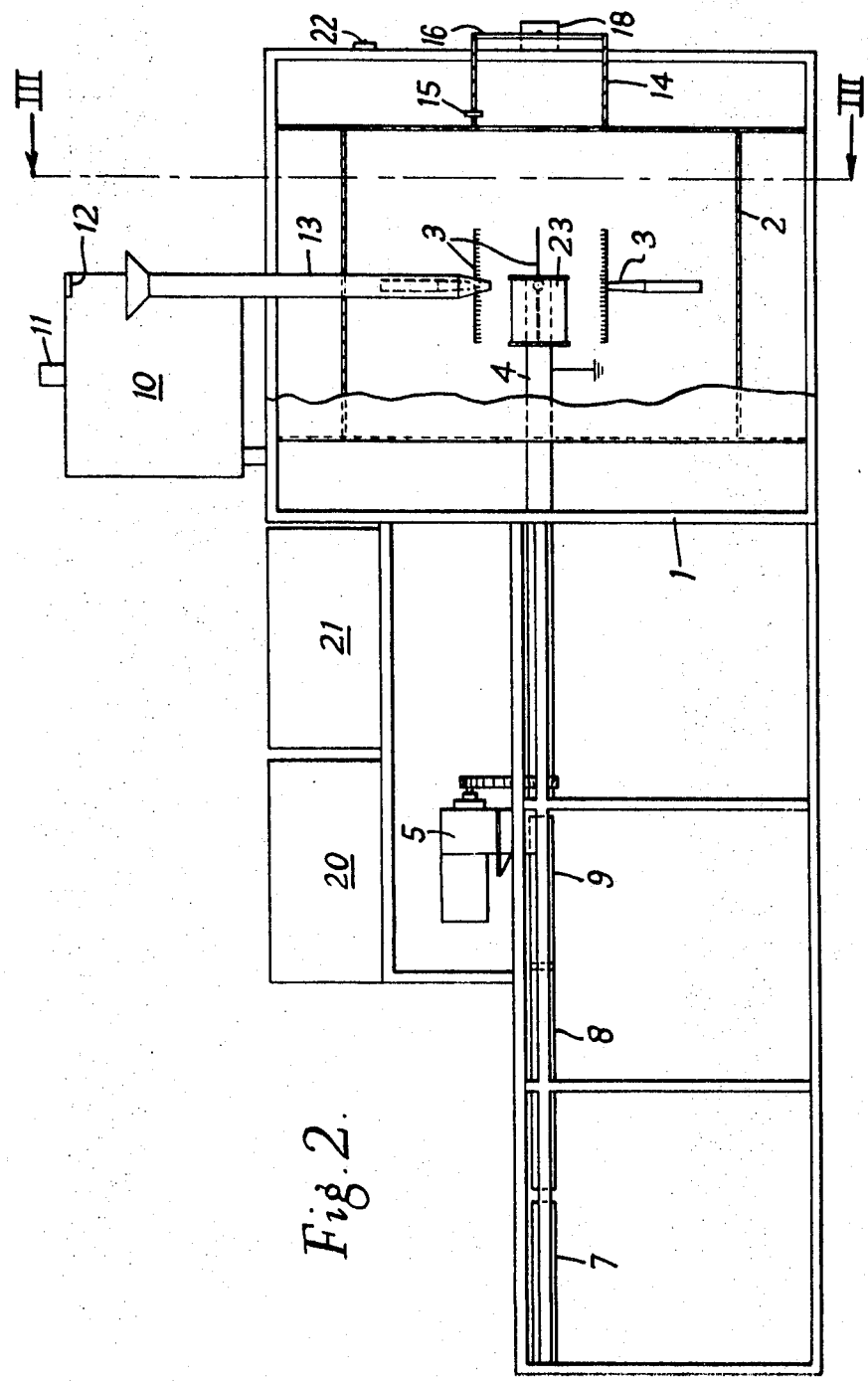

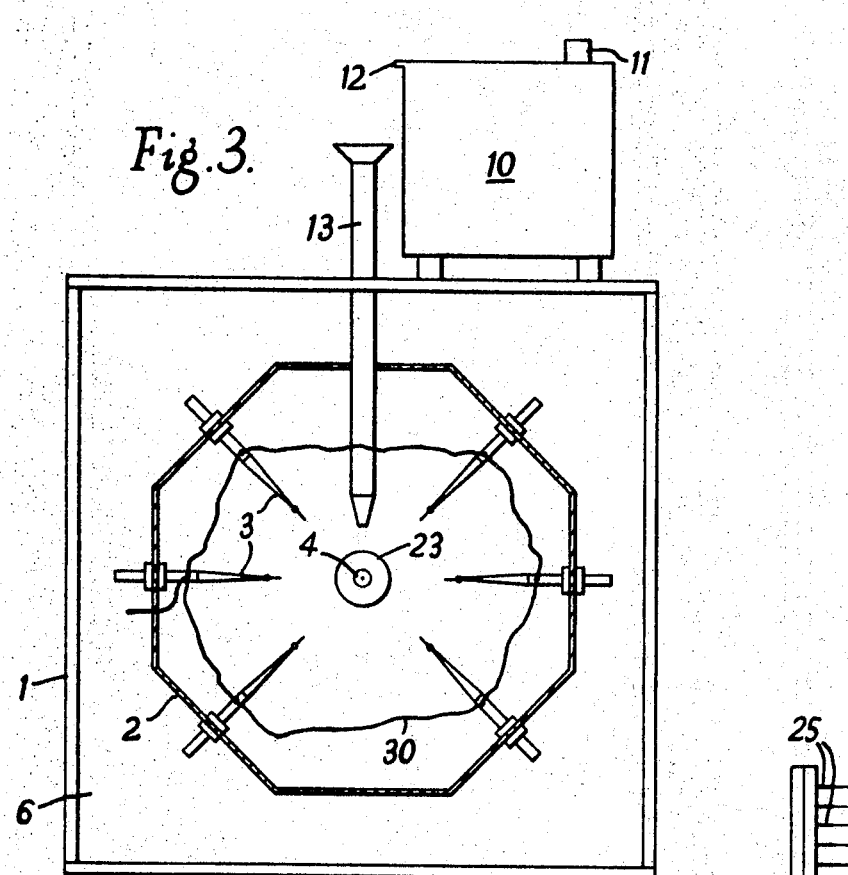
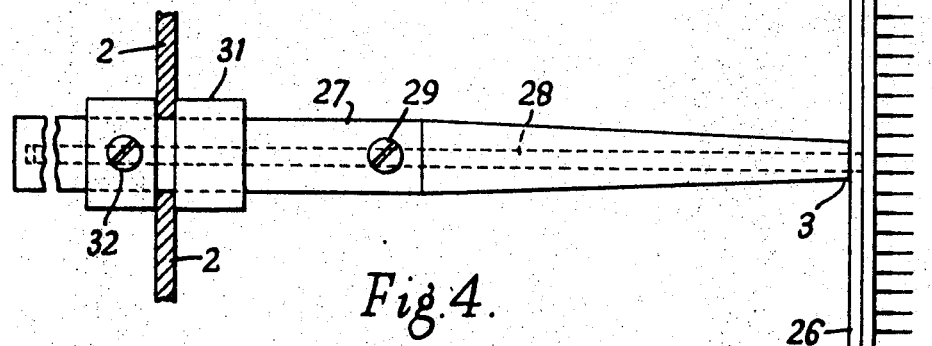

April 27, 1971  S. R. BARKER ET AL  3,576,928
PRODUCTION OF SHAPED ARTICLES
Filed Oct. 18, 1967  5 Sheets-Sheet 5
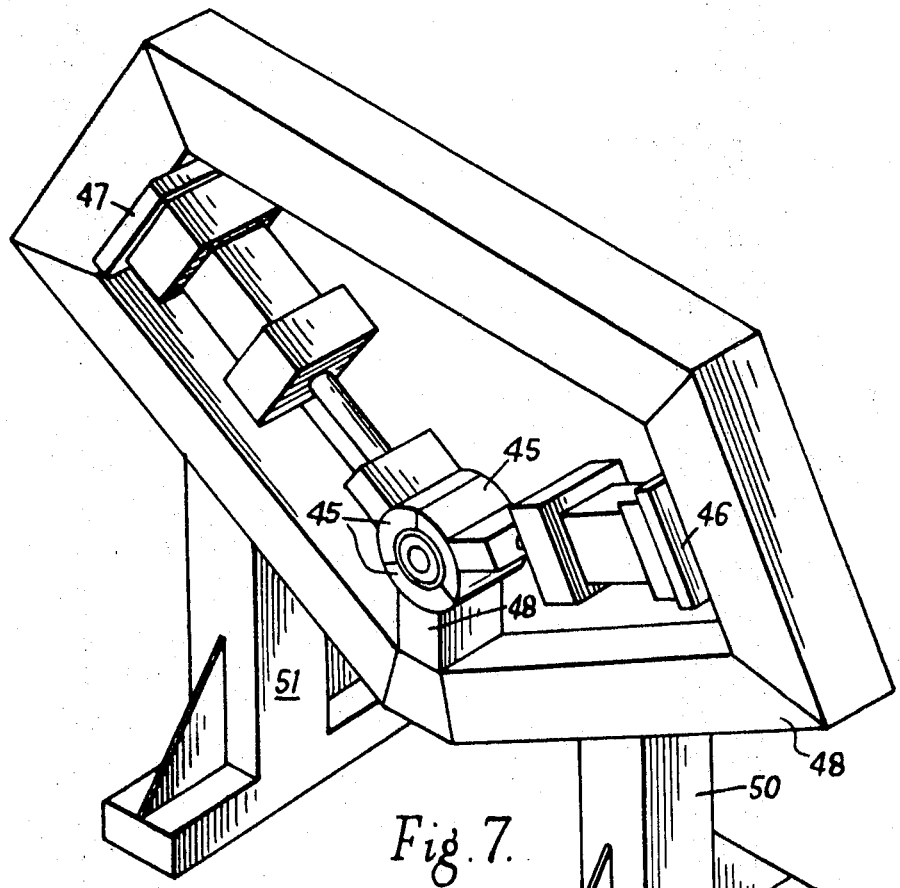
Fig. 7.
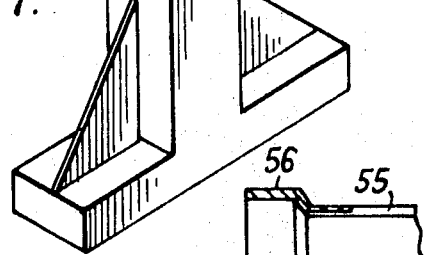
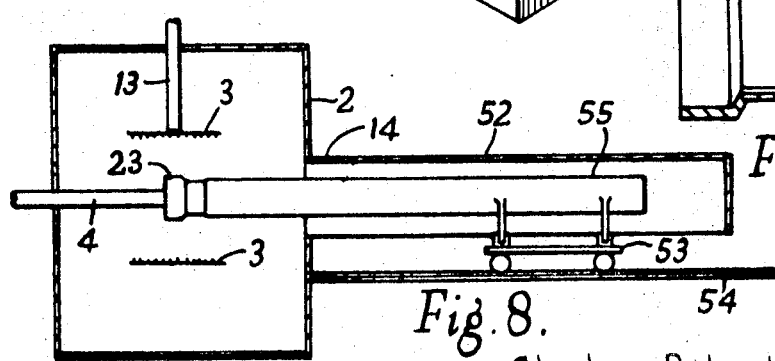
Fig. 9.
Fig. 8.
INVENTORS
Stanley Richard Barker
Frank Philip Packman
BY De Lio and Montgomery
ATTORNEYS 3,576,928
PRODUCTION OF SHAPED ARTICLES
Stanley Richard Barker, Gravesend, and Frank Philip Packman, Canterbury, England, assignors to British Uralite Limited
Filed Oct. 18, 1967, Ser. No. 676,122
Claims priority, application Great Britain, Oct. 24, 1966, 47,703/66
Int. Cl. B06b 1/02; B29f 5/00
U.S. Cl. 264—24
23 Claims

ABSTRACT OF THE DISCLOSURE

In the manufacture of articles from fibrous materials and a binder therefor in particulate form, an electrostatic charge is imparted to the fibres and binder particles which are attracted to and collected on a former or mould which is earthed or charged with a polarity opposite to that of the charged particles to form a layer of the required shape and thickness. The layer is treated to cause the fibres to bond together to form a self-supporting article before the resultant article is removed from the former, in those cases where removal takes place. In some cases the former may itself form part of the article. The method of the invention is particularly suitable for the manufacture of articles from asbestos and portland cement and from asbestos and bitumen, but other fibres and binders may also be used.

---

The present invention relates to the formation of articles from fibrous materials in the form of short fibres and finely divided solid particles of a binding material which can be cured, set or otherwise treated to bond the fibres together. A filling or bulking particulate material may also be incorporated in forming the articles.

The invention is primarily, though not exclusively, concerned with the formation of asbestos-cement and asbestos-bitumen articles for which cumbersome and time-consuming methods requiring the use of felting machines have previously been used.

It is an object of the present invention to provide a method of forming an article from short fibres and a binding material therefor in solid particulate form, e.g. asbestos and portland cement, which utilises apparatus which is simple to construct and operate and can be automatically controlled and which enables an article to be produced in a relatively short time.

According to the invention a method of making an article includes the steps of imparting an electrostatic charge to the fibres and the particles of the binding material, positioning a former which is earthed or charged with a polarity opposite to that of the charged fibres and particles so that the charged fibres and particles are attracted to and are collected on the surface of the former to form a layer or wrapping of the required thickness, the charged fibres and particles being collected on said surface either in admixture with one another or alternately as separate deposits, and treating the deposited material on the former to cause the particles of binding material to bond the fibres together to form a self-supporting layer or wrapping.

The method of the invention may be applied to the makng of a complete article, to the addition of a specially shaped part to an existing article, for example to the attachment of a socket to a pipe, or to the formation of a joint between two articles, which may themselves have been formed by the method of the invention. Furthermore, the fibres and particles may be collected on an external or an interior surface of a former (which may also be referred to as a mould) whichever proves the more suitable for forming the article. For makng a joint between two parts to form a complete article, the parts themselves may serve to provide the former or a part thereof which thus becomes part of the completed article. Furthermore, the former on which the article is built up may itself form part of the article as a reinforcement, e.g. it may be composed of sheet metal on one or both sides of which layers which could be self-supporting in themselves after the curing or like treatment are deposited.

The fibres and particles may be charged by being passed into or through an electrostatic field which may be produced in known fashion by a charging system connected to a high voltage electrical supply, the voltage being desirably at least 15 kv. and preferably at least 30 kv., up to 100 kv. or more. The electrical supply may be pure DC, pulsed DC or DC with superimposed AC of various frequencies and waveforms. When the article is of an enclosed, e.g. cylindrical form, the charging system is preferably arranged to produce a field cylindrically symmetrical about the axis of the former. For example the charging system may comprise a cage of wires which give a corona discharge. Alternatively it may comprise a plurality of comb-like structures having short parallel lengths of wire mounted perpendicularly on a common wire mounted in turn on an insulating mount and connected to the electrical supply, the comb-like structures being arranged symmetrically about the former with their axes parallel to the axis of the former and the short lengths of wire pointing towards the former. The charging system may be mounted to be movable relative to the former.

Among suitable fibrous materials for use in the method of the invention are natural fibres, e.g. asbestos, wool and sisal, and synthetic fibres, e.g. nylon. The binder materials include cements of various types, e.g. ordinary portland cement, and thermoplastic materials, e.g. bitumen and thermosetting and other resins which can be caused to flow or to be set and/or be cured to bond the fibres together to form a self-supporting article.

The fibres and particles used in the process of the invention should have a resistivity ranging from $10^5$ ohms to $10^{12}$ per cm.$^3$ or should be capable of adjustment, e.g. by the absorption of moisture, to fall within this range. In certain cases when fibres of an excessive resistivity, e.g. nylon, are used, it may be found that on removal of the electrostatic field the particles may be repelled from or drop off the former, particularly when a rotating former as hereinafter described is used, since they have substantially the same charge as a previous layer deposited on the former. In such cases, a modifier in particulate form may be included in the materials deposited on the former, which modifier modifies the behaviour of the other materials so that they are retained on the former even after the removal of the electrostatic field. Magnesium orthotitanate in particulate form has been found to be a very successful modifier for use with nylon fibres. The modifier may be deposited after complete deposition of the nylon fibres or between deposited layers of nylon fibres when intermittent deposition of fibres takes place. It is believed that the modifier acts to impart an apparent resistivity to the deposited layers which fall within the range referred to above.

In order to cause the binder materials to operate it may be necessary to supply appropriate materials, for example water or steam in the case of cement, or to heat the article with or without the application of pressure in the case of thermoplastic or thermosetting materials. The binder particles may be fed to the electrostatic field either mixed with or separated from the fibres and may be deposited in admixture with the fibres or the binder particles and fibres may be deposited as alternate layers in building up the article.

When a hydraulic cement is employed in the formation of the article, the water needed to set the cement may be supplied in the form of water or of steam. The water or steam may be supplied through the electrostatic field, the particles of water or steam becoming electrically charged in the same way as the particles of structural material. Alternatively, and preferably, the water or steam may be supplied to the deposit on the former whilst it is outside the field, for example by spraying which is preferably carried out intermittently during the build-up of the article.

The relative proportions of the materials included in the finished article may be those used in corresponding articles made by conventional methods.

Fibres having lengths in the range about 1 to about 35 mm. may be used in the process of the invention, but it is preferred to use a blend of fibres of different lengths with a maximum length of 9 mm. Thus the blend may consist of fibres of lengths ranging from 1 to 9 mm. Granular materials used may suitably have diameters in the range from 1.2 to 200µ. Plastics materials, when employed, may suitably be used in the form of powders or chips as obtainable from normal commercial sources, preferably with a maximum mean diameter of 0.295 mm., i.e. −52 mesh (British Standard).

The former or matrix used should conform to the shape of one surface of the finished article required. For example, it may be flat or corrugated where flat or corrugated sheets are to be produced or it may be cylindrical where cylindrical items are to be produced. The former or matrix is normally arranged to receive the particles of material on its outside surface, but where the required article is hollow, for example pipe-shaped or cup-shaped, the former may be set up to receive the particles on its inside surface. Where suitable, e.g. when the article to be produced is symmetrical about an axis, the former is preferably mounted on a rotatable axis which should be the axis of symmetry and is rotated during deposition of the material on it so as to provide a more even deposition. The former may also be arranged to reciprocate within or relatively to the electrostatic field by movement either of the field or of the former. Reciprocation of the former into and out of the field may suitably be used when it is desired to spray water on to the material collected on the former when it is outside the field. The former may be made of any material which enables its surface to be charged or earthed, and such materials include wood and metals. If desired, the former may be arranged to be collapsible for easy withdrawal from the finished article.

The former may be charged with the opposite polarity to that of the field so as to attract the charged fibres and particles. Additionally, it may be earthed.

Means may be provided to heat the former during collection of the structural material, as the use of a heated former has been found to give improved results in many cases. When the particles include thermoplastic material, for example bitumen, the former may be heated sufficiently to cause the thermoplastic material to soften and bond to form the finished article.

The fibres and particles may be allowed to fall under gravity into the electrostatic field from a source of supply, or they may be impelled into the field. The outlet nozzle from the source may be charged if desired. The source of supply may be caused to traverse the former to ensure more even coverage. Various forms of known feeder mechanisms may be employed to supply the particles of structural material to the electrostatic field, including air slides, centrifugal fans, screw conveyors, belt conveyors and vibrator conveyors. The choice of feeder mechanisms used in any given application will normally depend on the type of material being dispensed.

The particles may be fed into the electrostatic field perpendicular to the axis of the former and this is particularly suitable when the field is cylindrically symmetrical about the former and the article is being formed on the outside of the former. Alternatively, the particles may be introduced along the axis of the former at an angle to it less than 90°. The distance between the former and the inlet of the particulate material into the field may be varied according to the strength and configuration of the field, the type of article produced and the type of particles. However, for most purposes a distance of from 1 inch to 12 inches is a suitable and convenient range. The inlet should not be so close to the mould that sparkover occurs, and preferably not so far away that it is outside the field.

Alternatively or in addition to the introduction of the fibres and particles into an electrostatic field produced by a charging system, the fibres and particles may also be charged by being mixed with a stream of ionised air or other gas and introduced into the vicinity of the former in suspension in said stream. Also, a cloud of charged particles may be maintained in suspension in air or other gas surrounding the former.

The material on the former is treated to cause the binder to bond the fibres together before the resultant article is removed from the former in those cases where removal takes place. In the case of a thermoplastic binder this may take place by heating during the deposition of the fibres and particles. The treatment may, however, take place in all cases after the article has been formed. A partial curing or setting sufficient to make the article self-supporting may take place on the former and the curing or setting be completed after removal from the former.

After forming the article on the former and prior to its treatment for curing, setting or the like, it may be subjected to pressure, whilst still on the former, in a suitable press in order to produce a denser article and/or to improve the surface finish. The pressure may in suitable cases be applied during the treating operation for causing the binder to bond the fibres.

The method of the invention is particularly suitable for the manufacture of asbestos cement pipes and similar articles from asbestos fibres and portland cement particles. Asbestos fibres and portland cement have suitable resistivities for use in the method of the invention, a typical asbestos fibre resistivity being $10^6$ ohms/cm.$^3$ and a typical portland cement resistivity being $10^8$ ohms/cm.$^3$. The method of the invention permits the use of asbestos fibres of the lengths normally used for such articles. By the method of the invention asbestos cement pipes can be produced with a relatively short asbestos fibre which have the strength characteristics of pipes made by conventional methods using a longer fibre.

Referring to the accompanying drawings which schematically illustrate apparatus which may be used in carrying out the invention:

FIG. 2 is a part longitudinal sectional view of the apparatus of FIG. 1;

FIG. 3 is a section on the line III—III of FIG. 2;

FIG. 4 is a plan view of one of the electrodes of the electrostatic charging system of the apparatus;

FIG. 7 is an isometric view of a press which may be used for compacting a fitting formed on a former; and FIGS. 8 and 9 illustrate the attachment of a socket to a preformed pipe.

Figure 1:
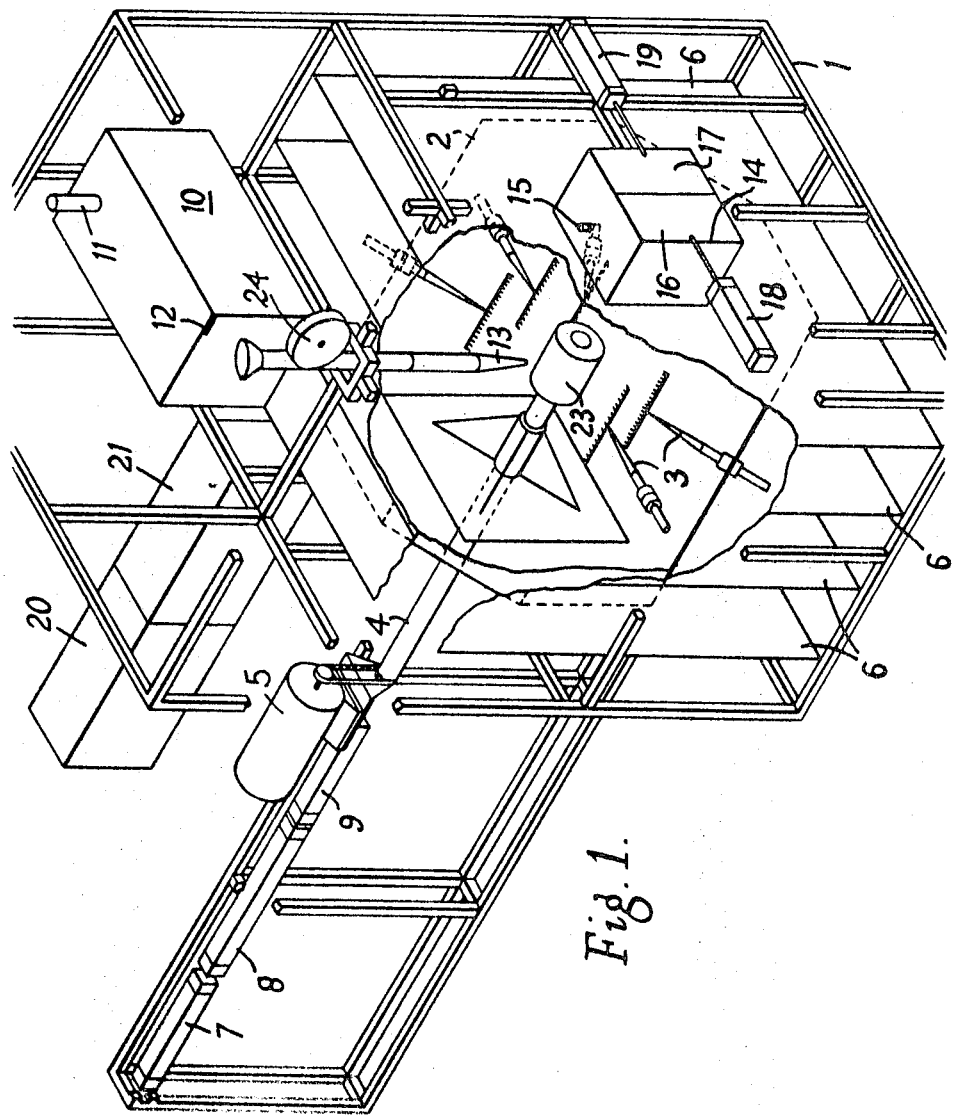
FIG. 1 is an isometric view of an apparatus suitable for use in the production of pipes, sockets, sleeves and similar fittings.

Referring to FIGS. 1, 2 and 3 of the drawings, 1 is the main framework of the machine formed of square section mild steel tube, 2 is an insulated chamber, the walls of which may be made of a transparent plastics material such as Perspex and within which are mounted six corona discharge electrodes 3 symmetrically disposed about a rotating shaft 4, arranged for rotation by a motor 5. The chamber 2 is mounted within insulated supports 6. Pneumatic rams 7, 8 and 9 are provided to impart reciprocating movements of different lengths to the shaft 4, the motor 5 being mounted to move with the ram 9. 10 is a vibratory bowl feeder provided with an inlet 11 and a short spout 12 feeding into an outlet nozzle 13 which extends into the insulated chamber 2 so as to feed material thereinto between the electrodes 3. 14 is a water spray compartment fitted with a spray nozzle 15 and fitted to an opening in the front wall of chamber 2 so that it opens thereinto. The compartment 14 is fitted at the front thereof with sliding doors 16, 17 operated respectively by pneumatic rams 18, 19. 20 and 21 represent electronic control systems, one programming the mechanical operations of the apparatus and the other controlling the electrical circuits. These control systems are provided with variable programming facilities which give automatic and variable control of the steps involved in the making of asbestos cement articles. Systems of this type can easily be designed or obtained to control varying sequences of operations and accordingly it is considered unnecessary to described the systems in detail. 22 is a starter button and 23 represents a former or mould which is fitted on the front end of the shaft 4 and on which the fibres and particles are collected in forming an article. A blower 24 (see FIG. 1) may be provided for blowing air into and downwardly through an injector through the nozzle 13. The use of the blower may be found necessary with some materials.

Referring to FIG. 4, the electrodes 3 each comprises a comb-like structure formed of nickel-plated steel needles 25 carried by a brass bar 26 mounted on an insulating rod 27. A stainless steel rod 28 extends within the insulating rod 27 and electrical connection with the needles is made via the steel rod 28 and a terminal screw 29. All the electrodes 3 are electrically connected by an insulated wire 30 (see FIG. 3) which is connected to a source of E.H.T. (extra high tension) externally of the machine, the shaft 4 being earthed. Each electrode 3 is adjustably mounted by virtue of the insulating rod being slidable within a bush 31 in a wall of chamber 2, and adjusting screw 32 being provided to fix the electrode in the required position.

Figure 5:
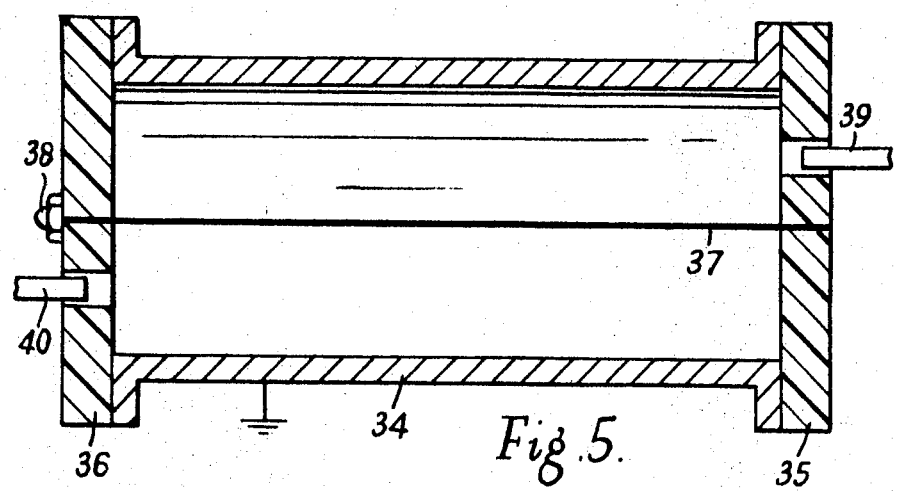
FIG. 5 illustrates an air ioniser.
Figure 6:
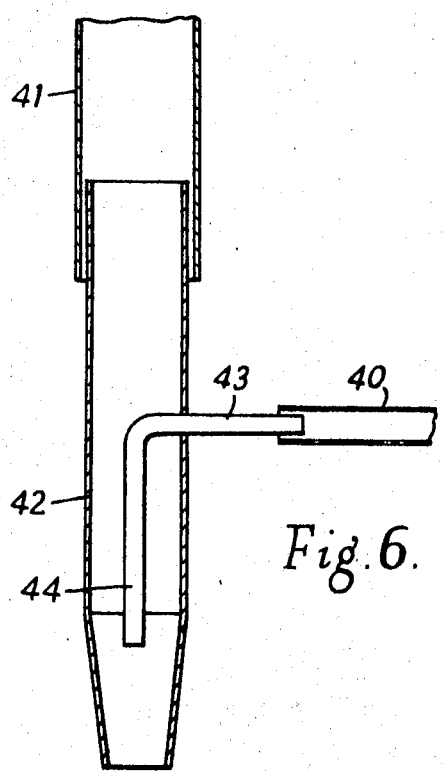
FIG. 6 illustrates a nozzle for feeding fibres and particles including means for the introduction of ionised air thereinto.

As will be descibed hereinafter, the fibres and particles used in the method of the invention may have an electrostatic charge imparted thereto by being mixed with a stream of ionised air and feeding the mixture through a charged nozzle. FIGS. 5 and 6 illustrate respectively an air ioniser and a modified nozzle for use therewith. Referring to FIG. 5, the air ioniser comprises a cylindrical steel tube 34 closed at each end by insulated end plates 35, 36 and having a non-insulated wire 37 extending down the centre of the tube with a terminal 38 for connection to an E.H.T. supply. An insulated air inlet 39 is provided at one end of the tube 34 and an insulated air outlet 40 at the other end. When the tube 34 is earthed and terminal 38 is connected to an E.H.T. electrical supply air passed through the tube is ionised by the field generated from the wire.

Referring to FIG. 6, the nozzle comprises an insulated inlet portion 41 and a metal outlet portion 42 which can be charged. A tube 43 entering from the side of the outlet portion 42 is bent to extend downwardly therethrough and is formed with a venturi outlet 44 emitting towards the outlet end of the nozzle. The tube 43 is adapted to be connected to the outlet 40 of the air ioniser.

Referring to FIG. 7, the press illustrated comprises three detachable dies 45, two of which are connected to hydraulic rams 46, 47 and the third to a fixed support 48. 49 is the frame and 50, 51 are the legs of the press.

Referring to FIG. 8, 2, 3, 4, 14 and 23 respectively represent generally the insulated chamber, electrodes, shaft, water compartment and former represented by the same numerals in FIGS. 1 to 3. The former 23 is shaped to form a socket for a pipe and is provided with a spigot (not shown) adapted to fit within the pipe end to be frictionally engaged therewith by means of a rubber O-ring. The water compartmnet 14 is extended by a shield 52 and the sliding doors are dispensed with or rendered inoperative. A trolley 53 running on rails 54 is provided to carry a pipe 55 to which a socket is to be attached.

FIG. 9 shows the end of the pipe 55 with a socket 56 attached thereto.

The sequence of operations performed on the machine illustrated in FIGS. 1, 2 and 3 in making asbestos cement fittings is as follows:

The machine starts with the rams 7, 8 and 9 fully extended so that the shaft 4 protrudes through the compartment 14, the sliding doors of which are open. The operator selects the required mould 23 and attaches it to the shaft 4 on which it is held by a spring-controlled catch (not shown). The starter button 22 is then pressed and this initiates the following sequence.

The shaft 4 and mould 23 rotate, rams 8 and 9 retract and withdraw the mould 23 through the water compartment 14, where it receives an application of water, into the chamber 2. When the mould has entered the compartment 14, the rams 18 and 19 are caused to operate by a cam to close the doors 16, 17. The closing of the doors 16 and 17 switches on the E.H.T. supply to the corona electrodes 3. Ram 7 then comes into operation to reciprocate the shaft 4 so that the mould 23 moves to and fro within the corona field. The operation of ram 7 also starts up the materials feed system to feed a mixture of asbestos fibres and cement from bowl feeder 10 through nozzle 13 into the chamber 2. After a predetermined number of passes of the mould 23 within the corona field in chamber 2 during which it receives coatings of fibres and binder particles, ram 8 "out" operates switching the materials feed system off and, with ram 7 remaining in its extended position, moving the mould into the water compartment 14 where it is sprayed with water. Ram 8 then operates to return the mould 23 into the corona field in chamber 2 and to switch on the materials feed system. Ram 7 also recommences its reciprocating movement. The procedure of applying coatings of asbestos-cement mixture is continued until the required thickness of asbestos-cement on the mould is obtained.

On the final pass of the mould into the water compartment, the rams 18, 19 operate to open doors 16, 17. The E.H.T. supply is switched off, the rotation of shaft 4 and mould 23 is stopped and ram 9 is actuated to move mould 23 out of the water compartment 14, presenting it to the operator for removal from the shaft 4.

Following are examples illustrating the invention.

EXAMPLE 1

A three inch asbestos cement loose socket (i.e. a short pipe) was made using the machine shown in FIGS. 1 to 3. The mould or former 23 of the required dimensions was made of aluminium. The corona electrodes 3 were adjusted so as to be cylindrically symmetrical about the shaft 4 with the cylinder embraced by the electrodes having a diameter of 14 inches. The outlet nozzle 13 was adjusted so that its feed end was 3½ inches from the mould.

In a typical run the bowl feeder 10 was filled with a mixture of 86% by weight portland cement and 14% by weight of a blend of asbestos fibres.

The sequence of operations previously described was then performed with the corona electrodes 3 connected to the negative terminal of a 60 kv. electrical supply source and the shaft 4 and mould 23 being earthed.

When a layer of the required thickness had been formed on the mould the process was stopped, the mould with its coating removed and the coating was allowed to set. When the coating had set and become self-supporting it was removed from the mould and put aside to complete curing. A satisfactory socket was produced in this manner.

The blend of fibres used in the above example was a mixture of 50% 5R and 50% 6D asbestos fibres, the gradings according to the Quebec Standard Tests performed on the Quebec Standard testing machine Model No. 2 devised by the National Research Council of Canada being as follows:

|  | 5R, ounces | 6D, ounces |
| --- | --- | --- |
| Retained on— |  |  |
| ½″ mesh | 0 | 0 |
| 4 mesh | 0 | 0 |
| 10 mesh | 10 | 7 |
| Retained in pan | 6 | 9 |

These figures represent the proportions of 16 ounces retained on each screen and the final amount delivered to the pan of a stack of three screens and a pan stacked in order as follows:

Mesh (inches)
(1) Upper screen ------------------------------- ½
(2) Middle screen ------------------------------ 4
(3) Lower screen ------------------------------- 10
(4) Pan screen ---------------------------------- --

The above example was repeated using an Extra High Tension electrical supply of 45 kv., 50 kv. and 55 kv. and also with mixtures of 8% asbestos and 92% cement and of 11% asbestos and 89% cement. Satisfactory results were obtained in each case.

EXAMPLE 2

Utilising the same blend of asbestos fibres as was used in Example 1 and finely divided bitumen, an article of similar shape to that produced in Example 1 was made. The procedure followed was similar to that of Example 1 except that the asbestos and bitumen were separately fed in alternation to the electrostatic field and deposited on the mould as alternate layers. Water spraying took place between cycles. When the desired thickness of material had been built up on the mould, it was removed and heated to a temperature sufficient to melt the bitumen and cause it to flow to bond the fibres together. On cooling, the bonded mass was removed from the mould. A bitumen bonded asbestos fibre loose socket was produced in this manner. The material collected on the mould consisted of 50% by weight of asbestos and 50% by weight of bitumen. The water spraying operation was found to be of advantage when bitumen was used as the binder. The water appears to assist the subsequent fluxing and the formation of a brittle skin is apparently avoided by its use.

When steam was used instead of water in the above example, satisfactory results were obtained.

EXAMPLE 3

The nozzle 13 of the apparatus shown in FIGS. 1 to 3 was modified as shown in FIG. 6 and the tube 43 connected to an air ioniser of the construction shown in FIG. 5. Repeating the procedure of Example 1 with the modified apparatus and using a 55 kv. electrical supply (300 microamp current) for charging both the air ioniser and the corona electrodes and feeding the ionised air into the nozzle 13, very good results were obtained in making a 3″ loose socket from a mixture of 11% asbestos of the blend given above and 89% portland cement.

EXAMPLE 4

Example 3 was repeated using the modified apparatus referred to therein for admixing ionised air with a mixture of 50% asbestos and 50% finely divided bitumen. The electrical supply was 50 kv. and a current of 1 milliamp. The deposited layer was heated to 250° and then cooled. A satisfactory product was obtained.

EXAMPLE 5

This example illustrates the advantages to be obtained from the use of magnesium orthotitanate. The modified apparatus described in Example 3 was employed with a 75 kv. electrical supply at 500 microamps applied as set out in Example 3. Steam was sprayed on to the mould between cycles. A 9 to 1 cement to asbestos ratio was used. Magnesium orthotitanate was introduced in the following three ways:

(a) 28% magnesium orthotitanate (based on cement plus asbestos) sprayed on to the mould initially.
(b) 28% magnesium orthotitanate (based on cement plus asbestos) was sprayed on to the mould at the end of the experiment.
(c) 66% magnesium orthotitanate (based on cement plus asbestos) was mixed with the cement and asbestos and sprayed with them.

In each case good results were achieved and the proportion collected and retained on the mould was higher than when no magnesium orthotitanate was employed.

EXAMPLE 6

Experiments were carried out to show the effect of heating the mould. The apparatus and procedure of Example 1 were employed with additional heating means for heating the mould.

In these runs portland cement, asbestos and bitumen were deposited in separate runs on the mould, which had been heated to 250° C. The proportion collected was in each instance higher than obtained using a cold mould in corresponding conditions. The bitumen melted on contact with the mould.

In a fourth run a mixture of 50% asbestos and 50% bitumen was deposited on the mould which was at a temperature of above 300° C. The bitumen in the mixture was melted on contact with the mould and fluxed the asbestos and bitumen together.

EXAMPLE 7

Experiments were carried out to study the effect of switching the mains supply to the E.H.T. transformer between two voltage levels in the course of the deposition.

The apparatus described in Example 3 was employed with a basic E.H.T. negative voltage of 60 kv. and a current of 400 microamps.

In two runs one using asbestos alone and the other portland cement alone the mains supply was switched at 0.5 cycle sec. Collection was improved compared with the collection using DC supply at a constant level only.

In two further runs with the same two materials the mains supply was switched at 1 cycle/sec. Collection in each case was even better than at the 0.5 cycle/sec. switching rate.

EXAMPLE 8

This example illustrates the compacting of a tubular fitting produced as set forth in Example 1. When the former 23 has been coated to the required thickness and been removed from the machine, it is mounted (before any bonding treatment is applied) between the three dies 45 of the press shown in FIG. 7, the dimensions and shape of the dies being such that when brought together by the inward movements of rams 46 and 47 they will apply an even pressure over the surface of layer 52 on the former 23 and compress the layer. The compressed article with the former is removed from the press, allowed to set and the fitting then separated from the former. A denser fitting with an improved surface finish is obtained in this manner.

EXAMPLE 9

This example illustrates the attachment of a socket part to a preformed pipe, reference being made to FIGS. 8 and 9. The end of the pipe is prepared by reducing its thickness by half and forming shallow circular indentations in the surface of the reduced portion. The reduced pipe end is then fitted to the former 23 which has a spigot which is frictionally engaged within the pipe. The procedure of Example 1 is then repeated to build up continuous coatings of asbestos and cement on the reduced end portion of pipe 55 and on former 23. When the desired thickness has been attained, the pipe, socket and mould are removed as one unit and the newly formed part allowed to set. After removal from the former and curing a pipe with socket attached as shown in FIG. 9 is obtained.

EXAMPLE 10

Tests were carried out with various other materials which may be used as fillers, binders or fibres, as the case may be, in the method of the invention to determine the proportion collected on the mould. In each case the apparatus and procedure of Example 1 was employed except that the wetting operation was omitted. Satisfactory results were obtained in collection on the mould while the electrostatic field was in operation with polythene filings, polyvinylchloride particles, expanded polystyrene particles, nylon fibres and cellulose fibres. However, on switching off the high voltage supply for the electrostatic field, material was lost from the former. It was found that by overcoating the deposits with magnesium orthotitanate as intervening layers or as the final layer the material was retained on the mould without appreciable loss when the high voltage supply was switched off.

Very good results were obtained with magnesium orthotitanate by itself and with powdered chalk.

A typical timing schedule for the manufacture, excluding setting and curing, of a 4 inch diameter split socket from asbestos and portland cement in the manner set out in Example 1 is shown in the following table.

| Operation Number | Sequential details | Time taken (seconds) |
|---|---|---|
| 1 | Operative attaches mould to shaft | 2.0 |
| 2 | Operative presses start button | 1.0 |
| 3 | Mould passes through water compartment receiving application of water. | 2.0 |
| 4 | Mould passes out of water compartment into corona chamber where two layers of asbestos cement are applied. | 8.0 |
| 5 | Mould passes out of corona chamber into water compartment where it receives two applications of water. | 4.0 |
| 6 | Operation No. 4 is repeated | 8.0 |
| 7 | Operation No. 5 is repeated | 4.0 |
| 8 | Operation No. 4 is repeated | 8.0 |
| 9 | Mould passes out of corona chamber into water compartment where it receives one final application of water. | 2.0 |
| 10 | Mould presented to operative | 2.0 |
| 11 | Mould removed from shaft | 2.0 |
| | Total time | 43.0 |

We claim:

1. A method of making a hollow shaped article or part thereof from a fibrous material and a binding material in particulate form which can be treated to bond the fibres together, which method includes the steps of creating a substantially symmetrical electrostatic field, positioning a rotatable forming member within the electrostatic field, imparting an electrostatic charge to the fibres and particles of the binding material and applying the fibres and particles to the forming member while rotating the forming member in the electrostatic field, earthing or charging the forming member with a polarity opposite to that of the charged fibres and particles so that the fibres and particles are attracted to and collected on a surface of the former to form a layer or wrapping of the required thickness, treating the deposited material on the former to cause the particles of binding material to bond the fibres together and define said hollow shaped article on said forming member, and removing the hollow shaped article from the forming member.

2. A method as claimed in claim 1, in which the charged fibres and particles are applied to and collected on the said surface of the former in admixture with one another.

3. A method as claimed in claim 1, in which the charged fibres and particles are applied to and collected on said surface of the former as alternate, separate deposits.

4. A method as claimed in claim 1, in which the fibres and the binding material is portland cement and in which the material deposited on the former is treated by being wetted with water or steam.

5. A method as claimed in claim 1, in which the fibres are asbestos fibres and the binding material is bitumen and in which the material deposited on the former is treated by being wetted with water or steam.

6. A method as claimed in claim 4, wherein the asbestos fibres comprise a blend of fibres of different lengths up to a maximum length of 9 mm.

7. A method as claimed in claim 4, in which the former and material deposited thereon are moved out of the electrostatic field for wetting.

8. A method as claimed in claim 7, in which the collection of material on the former is periodically interrupted and the material deposited on the former is periodically wetted during the interruptions of said collection.

9. A method as claimed in claim 1 in which the former is reciprocated and rotated within the electrostatic field during the collection of material thereon.

10. A method as claimed in claim 1 wherein the electrostatic field is produced by a charging system connected to a high voltage electric source of at least 30 kv.

11. A method as claimed in claim 1 wherein the electrostatic field is created cylindrically symmetrical about the axis of the former.

12. A method as claimed in claim 1 wherein the electrostatic field is created by at least one electrode giving a corona discharge.

13. A method as claimed in claim 12, wherein the electrodes each comprises a comb-like structure having short parallel needle-like metal teeth attached to a cross piece of conducting material carried by an insulated mount and connected to an electrical supply source.

14. A method as claimed in claim 13, wherein the comb-like structures are mounted symmetrically about the axis of the former with the teeth facing the former.

15. A method of making an article from asbestos fibres and portland cement which comprises creating an electrostatic field, feeding a mixture of the fibres and portland cement into the electrostatic field surrounding a former which rotates and reciprocates axially within the field and is earthed or charged with a polarity opposite to that of the field, whereby evenly distributed coatings of fibre and cement are collected on the former, periodically moving the former out of the field, applying water to the coating thereon whilst it is out of the field and moving the former back into the field, the sequence of operations being repeated until the required thickness of the coating on the former is attained when the former is finally moved out of the field, the coating thereon is allowed to set, the resultant self-supporting coating is then removed from the former and curing completed.

16. A method of making an article from asbestos fibres and bitumen which comprises creating an electrostatic field, feeding a mixture of the fibres and bitumen particles into the electrostatic field surrounding a former which rotates and reciprocates axially within the field and is earthed or charged with a polarity opposite to that of the field, whereby evenly distributed coatings of fibre and bitumen are collected on the former, periodically moving the former out of the field, applying water to the coating thereon whilst it is out of the field and moving the former back into the field, the sequence of operations being repeated until the required thickness of the coating on the former is attained when the former is finally moved out of the field, the coating is heated to cause the bitumen to flow, and after cooling the resultant self-supporting layer is removed from the former.

17. A modification of the method claimed in claim 15 in which the fibres and particles of the binder are collected as alternate thin layers on the former.

18. A method as claimed in claim 15, in which the former with the deposited layer thereon is moved out of the electrostatic field for treatment of the binding material and prior to the treatment for bonding the fibres together, the layer on the former is compacted by being subjected to pressure.

19. A method as claimed in claim 1 wherein the fibres and/or particles have an electrical resistivity ranging from $10^5$ to $10^{12}$ ohms per cm.$^3$ or are adjusted or modified to have an electrical resistivity or apparent electrical resistivity of this range.

20. A method as claimed in claim 5, wherein the asbestos fibres comprise a blend of fibres of different lengths up to a maximum length of 9 mm.

21. A method as claimed in claim 5, in which the former and material deposited thereon are moved out of the electrostatic field for wetting.

22. A method as claimed in claim 21, in which the collection of material on the former is periodically interrupted and the material deposited on the former is periodically wetted during the interruptions of said collection.

23. A modification of the method claimed in claim 16, in which the fibres and particles of the binder are collected as alternate thin layers on the former.

References Cited

UNITED STATES PATENTS

| | | | |
|---|---|---|---|
| 2,920,679 | 1/1960 | Sittel | 264—24 |
| 3,234,600 | 2/1966 | Goldsworthy | 264—24 |
| 2,082,399 | 6/1937 | Isman | 25—Asbestos Dig. |

OTHER REFERENCES

Paint, Oil & Chemical Review, "Applying Coating Electrostatically," pp. 7 and 18, May 4, 1944.

ROBERT F. WHITE, Primary Examiner

R. SHEAR, Assistant Examiner

U.S. Cl. X.R.

264—113

PO-1050
(5/69)

UNITED STATES PATENT OFFICE
CERTIFICATE OF CORRECTION

Patent No. 3,576,928          Dated    April 27, 1971

Inventor(s) Stanley R. Barker and Frank P. Packman

It is certified that error appears in the above-identified patent and that said Letters Patent are hereby corrected as shown below:

In the claims, Claim 4, Line 1, after "fibres" insert -- are asbestos fibres --.

Signed and sealed this 7th day of December 1971.

(SEAL)
Attest:

EDWARD M. FLETCHER, JR.      ROBERT GOTTSCHALK
Attesting Officer             Acting Commissioner of Patents